United States Patent
McCall

(10) Patent No.: US 10,452,563 B1
(45) Date of Patent: Oct. 22, 2019

(54) CACHE EVICTION SCHEME FOR ACCEPTABLE SUBSTITUTES IN ONLINE MEDIA

(71) Applicant: Akamai Technologies, Inc., Cambridge, MA (US)

(72) Inventor: Michael McCall, Arlington, MA (US)

(73) Assignee: Akamai Technologies, Inc., Cambridge, MA (US)

(*) Notice: Subject to any disclaimer, the term of this patent is extended or adjusted under 35 U.S.C. 154(b) by 0 days.

(21) Appl. No.: 15/972,797

(22) Filed: May 7, 2018

(51) Int. Cl.
*G06F 12/12* (2016.01)
*G06N 20/00* (2019.01)
*G06F 12/123* (2016.01)

(52) U.S. Cl.
CPC ............ *G06F 12/12* (2013.01); *G06F 12/123* (2013.01); *G06N 20/00* (2019.01); *G06F 2212/1044* (2013.01)

(58) Field of Classification Search
USPC .......................................................... 711/133
See application file for complete search history.

(56) References Cited

U.S. PATENT DOCUMENTS

| | | | |
|---|---|---|---|
| 6,272,598 B1 | 8/2001 | Arlitt et al. | |
| 6,378,053 B1 | 4/2002 | Lamaire et al. | |
| 6,421,761 B1 | 7/2002 | Arimilli et al. | |
| 6,721,850 B2 | 4/2004 | Hofmann et al. | |
| 6,820,133 B1 | 11/2004 | Grove et al. | |
| 6,826,593 B1 | 11/2004 | Acharya et al. | |
| 7,107,321 B1* | 9/2006 | Shaffer | G06F 12/0888 709/213 |
| 7,111,057 B1 | 9/2006 | Wein et al. | |
| 7,240,100 B1 | 7/2007 | Wein et al. | |
| 7,274,658 B2 | 9/2007 | Bornstein et al. | |
| 7,296,082 B2 | 11/2007 | Leighton et al. | |
| 7,376,716 B2 | 5/2008 | Dilley et al. | |
| 7,472,178 B2 | 12/2008 | Lisiecki et al. | |
| 7,660,296 B2 | 2/2010 | Fletcher et al. | |
| 9,418,353 B2 | 8/2016 | Flack et al. | |
| 9,419,852 B1 | 8/2016 | Kobrin et al. | |

(Continued)

OTHER PUBLICATIONS

Ali, A Survey of Web Caching and Prefetching, Int. J. Advance. Soft Comput. Appl., vol. 3, No. 1, Mar. 2011 ISSN 2074-8523; Copyright © ICSRS Publication, 2011 www.i-csrs.org, 27 pages. Downloaded Nov. 17, 2017 from http://home.ijasca.com/data/documents/IJASCA15_A-Survey-of-Web-Caching.pdf.

(Continued)

*Primary Examiner* — Than Nguyen

(57) ABSTRACT

Among other things, this document describes systems, devices, and methods for improving cache performance when caching multiple versions of an object. In some embodiments, a network cache can execute a cache eviction algorithm that considers the versatility of object versions when making eviction decisions. The techniques described herein can be applied to wide variety of media objects, such as as an original image and a set of derivative images in various formats, sizes, or compression levels. A versatile version is versatile because it can be substituted for one or more other versions requested by a client. Hence, the techniques described herein may prefer, under certain conditions, to evict from a network cache less versatile versions prior to evicting more versatile versions.

19 Claims, 5 Drawing Sheets

(56) References Cited

U.S. PATENT DOCUMENTS

| | | | |
|---|---|---|---|
| 2004/0098463 A1 | 5/2004 | Shen et al. | |
| 2008/0231480 A1 | 9/2008 | Lai et al. | |
| 2011/0173345 A1 | 7/2011 | Knox et al. | |
| 2013/0268733 A1* | 10/2013 | Narayanan | G06F 12/0888 711/119 |
| 2014/0052762 A1* | 2/2014 | Shoolman | H03M 7/3088 707/803 |
| 2019/0163642 A1* | 5/2019 | Venkatasubramanian | G06F 12/1027 |

OTHER PUBLICATIONS

Cardellini, et al., Collaborative Proxy System for Distributed Web Content Transcoding, 8 pages, CIKM 2000, McLean, VA USA. Downloaded Nov. 17, 2017 from ftp://ftp.cse.buffalo.edu/users/azhang/disc/disc01/cd1/out/papers/cikm/p520.pdf.

Chang, et al., On Exploring Aggregate Effect for Efficient Cache Replacement in Transcoding Proxies, IEEE Transactions on Parallel and Distributed Systems, vol. 14, No. 6, Jun. 2003, 14 pages. Downloaded on Nov. 17, 2017 from http://ntur.lib.ntu.edu.tw/bitstream/246246/141950/1/23.pdf.

Hung, On Designing a Shortest-Path-Based Cache Replacement in a Transcoding Proxy, 30 pages. Available at http://arbor.ee.ntu.edu.tw/—hphung/publication/HungOD06.pdf Downloaded Nov. 17, 2017.

Kangasharj, et al., Distributing Layered Encoded Video through Caches, 12 pages. For presentation at IEEE Infocom 2001, Anchorage AK, Downloaded Nov. 17, 2017 from http://mre.faculty.asu.edu/layered_vid_tr.ps.

Kequi Li, et al., Cache Replacement for Transcoding Proxy Caching, 2005 IEEE, 9 pages. Downloaded Nov. 17, 2017 from https://hekyll.services.adelaide.edu/au/dspace/bitstream/2440/36934/1/hdl36934.pdf.

Li, et al., SpringerLink, An Effective Cache Replacement Algorithm in Transcoding-Enabled Proxies, The Journal of Supercomputing, Feb. 2006, vol. 35, Issue 2, pp. 165-184, 8 pages. Available at https://link.springer.com/article/10.1007/s11227-006-2920-9.

Lum, et al., On Balancing Between Transcoding Overhead and Spatial Consumption in Content Adaptation, MOBICOM'02, Sep. 23-26, 2002, Atlanta, Georgia, USA, 12 pages.

Menaud, et al., Improving the Effectiveness of Web Caching, 27 pages. Downloaded on Nov. 17, 2017, from http://citeseerx.ist.psu.edu/viewdoc/download;jsessionid=52FCEF74832667591409416B6E0E7153?doi=10.1.1.75.8803&rep=rep1&type=pdf.

Podlipnig, et al., A Survey of Web Cache Replacement Strategies, ACM Computing Surveys, vol. 35, No. 4, Dec. 2003, pp. 374-398, 25 pages. Downloaded Nov. 17, 2017 from http://www.cs.ucf.edu/—dcm/Teaching/COT4810-Fall%202012/Literature/WebCacheReplacementStrategies.pdf.

Psounis, et al., A Randomized Web-Cache Replacement Scheme, IEEE Infocom 2001, 9 pages. Downloaded Nov. 17, 2017 from http://ee.usc.edu/netpd/assets/001/58510.pdf.

Shen, HP Laboratories, Caching Strategies in Transcoding-enabled Proxy Systems for Streaming Media Distribution Networks, Dec. 10, 2003, 11 pages. Downloaded Nov. 20, 2017 from http://www.hpl.hp.com/techreports/2003/HPL-2003-261.pdf.

Yeung, et al., A Cache Replacement Policy for Transcoding Proxy Servers, , IEICE Transaction on Communications, Jan. 2004, Downloaded on Nov. 17, 2017. Available at https:https://www.researchgate.net/publication/236612343_A_Cache_Replacement_Policy_for_Transcoding_Proxy_Servers/links/02e7e51847a1bcc58000000.pdf, 4 pages.

* cited by examiner

CACHE EVICTION SCHEME FOR ACCEPTABLE SUBSTITUTES IN ONLINE MEDIA

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This application relates generally to network caching systems, methods and apparatus.

Brief Description of the Related Art

Online media, including images, video, and audio, represent a significant percentage of traffic delivered on the Internet. It is commonplace to serve different versions of a media file to accommodate different browsers, network conditions, client devices, player applications, and the like. These versions are often nearly identical to each other, typically, differing only in encoding quality and encoded format.

For example, currently all web browsers support JPEG images, but Chrome, Safari, and Internet Explorer each support different and incompatible formats similar to JPEG that offer better compression at higher quality than JPEG. Likewise, lossy JPEG images may be encoded at different quality levels to support delivery over varying network conditions. A website owner may make available (or have a service provider make available) an array of such versions so as to provide an optimal experience to end users.

Caching is a known technique to accelerate the delivery of image files or other objects across the Internet. When a client makes a request for a given object, a network cache relatively close to the client can look in its local data store to see if it is has a valid copy of the requested object. If so, the network cache can serve the object to the client, avoiding the latency associated with requesting the object from an origin server, which is generally further away, and at the same time reducing load on the origin server. Content delivery networks (CDNs) are distributed systems and typically have a large distributed set of such network caches, deployed to serve objects on behalf of the CDN's content provider customers, who host websites, web applications, or other digital properties on their origin infrastructure.

Because storage space in a network cache is finite, eventually free space can become low, and so a network cache uses a cache eviction algorithm in order to decide which objects to remove in order to make room for others. For example, the network cache can evict infrequently-accessed content to make room for more popular items. This approach is referred to as a 'least recently used' (LRU) eviction algorithm. Another known algorithm prefers to evict content that is least frequently used (LFU). Storing multiple versions of content requires more storage, and increases the eviction pressure on a network cache.

Conventional cache eviction algorithms do not take into consideration that an acceptable substitute version of an object could be served in place of a requested object. Put another way, conventional cache eviction algorithms do not consider that some versions of objects are versatile, in that they can be served as an acceptable substitute for one or more other object versions, and therefore that the eviction of such versatile objects should be disfavored.

This patent document outlines a novel cache eviction scheme that leverages the versatile nature of some objects to improve the use of storage space and to improve cache hit ratio. Those skilled in the art will understand these and other improvements from the teachings hereof.

BRIEF SUMMARY

Among other things, this document describes systems, devices, and methods for improving cache performance when caching multiple versions of an object. In some embodiments, a network cache can execute a cache eviction algorithm that considers the versatility of object versions when making eviction decisions. The techniques described herein can be applied to wide variety of media objects, such as as an original image and a set of derivative images in various formats, sizes, or compression levels. An object that is versatile indicates that the object can be substituted for one or more other versions requested by a client. Hence, the techniques described herein may prefer, under certain conditions, to evict from a network cache less versatile versions prior to evicting more versatile versions.

The versatility of an object may be expressed in a variety of ways. For example; versatility may be a binary label (true/false) or may be based on a quantitative measure, or implicitly reflected in an ordered list of versions or a graph of versions. Information about the versatility of an object may be provided by an origin server, learned by the network cache or an associated system, or otherwise obtained. A preference list may be provided to rank the versatility of objects. The measure of versatility and the value placed on versatility in eviction decisions may vary from embodiment to embodiment. The teachings hereof do not require that versatility be the sole or dominant factor in eviction decisions. It is contemplated that other cache eviction algorithms known in the art, such as those based on object popularity and size, can be used with the teachings introduced in this document as part of an overall cache eviction strategy.

The teachings hereof can be used to improve the performance of an object cache by increasing the hit rate, increasing offload for an origin, and intelligently reducing cache footprint (among other things) and thereby improve the performance and operation of computers, computer networks, and network infrastructure.

The foregoing is a description of certain aspects of the teachings hereof for purposes of illustration only; it is not a definition of the invention. The claims define the scope of protection that is sought, and are incorporated by reference into this brief summary. The claims are incorporated by reference into this section.

BRIEF DESCRIPTION OF THE DRAWINGS

The invention will be more fully understood from the following detailed description taken in conjunction with the accompanying drawings, in which.

DETAILED DESCRIPTION

Figure 1:
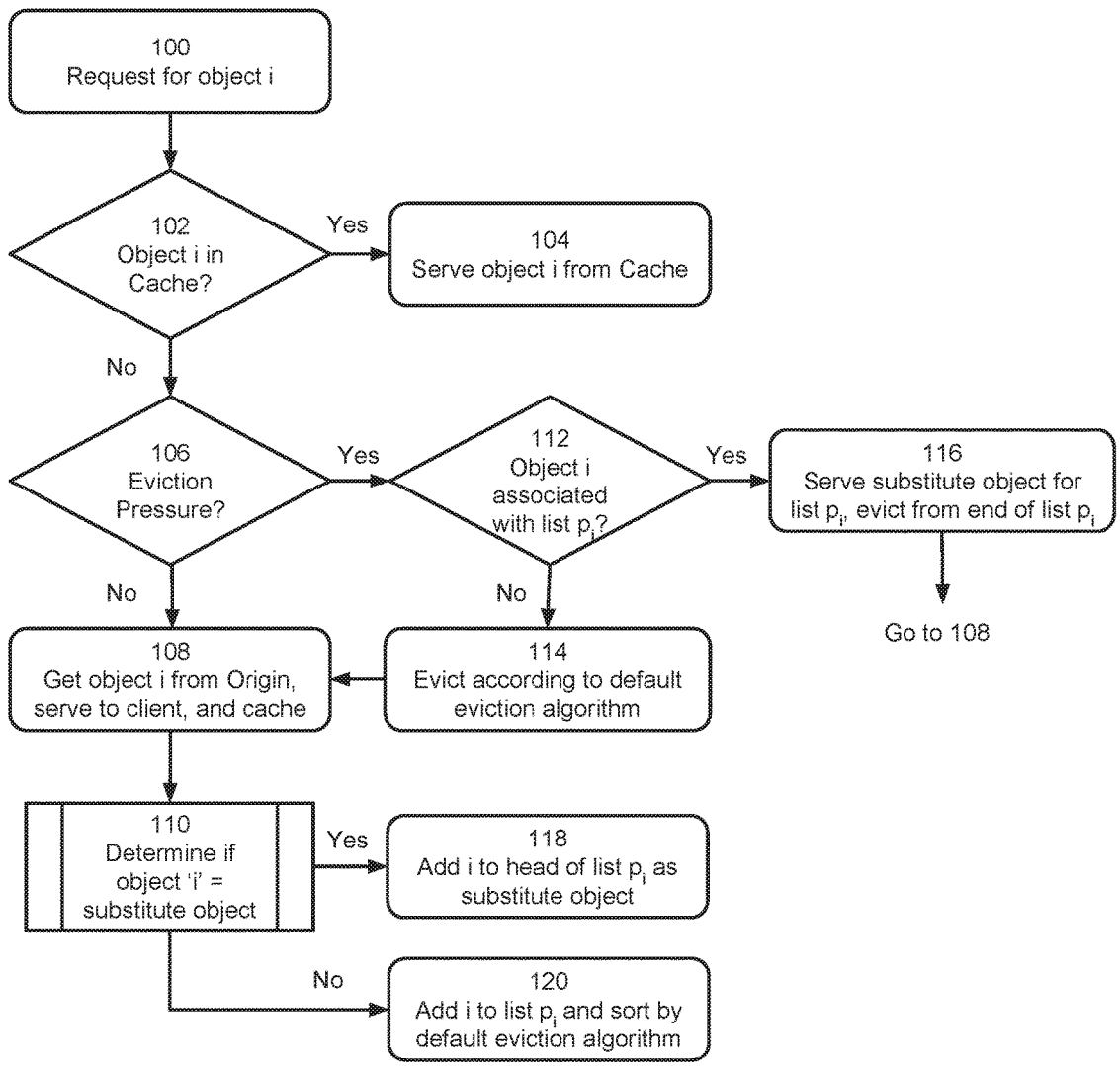
FIG. 1 is a flow diagram illustrating steps in a method for identifying objects to evict from a cache, in one embodiment.

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a browser or other user-agent presentation defined by an HTML or other markup language document.

The terms 'object', 'file' and 'resource' are used interchangeably in this patent document.

The term 'version' is used herein to refer to a particular version of a media object. Typically, each version is an object that is available to end user clients or other clients from a web server or within a server infrastructure. For example, an original version of a media object 'foo.jpg' might be encoded into different formats, different compression levels, and the like. (Of course, the original could also be an uncompressed format.) From an original media object one might create several derivative versions, such as a JPEG2000 (foo.jp2), WebP (foo.webp), and PNG (foo.png).

Different versions can mean but does not necessarily mean different content types. Different compression levels or pixel sizes could be used to create different object versions, e.g., 'foo_lowquality.jp2.' and the like. Each version of 'foo' is an object, including even the original version, each object preferably having metadata describing its format (referred to as media type or content type or MIME type), dimensions, compression ratio, and other information.

Introduction

It is common to serve different versions of a media object to accommodate different browsers, network conditions, client hardware, player applications, and the like. These versions are often nearly identical to each other, typically differing only in encoding quality and encoded format. A content provider may begin with an original version of an image and create several derivative versions from it. Also, modern cloud services platforms now provide image management tools that perform that function automatically.

For example, currently all web browsers support JPEG images, but Chrome, Safari, and Internet Explorer each support different and incompatible formats similar to JPEG that offer better compression at higher quality than JPEG. Likewise, lossy JPEG images may be encoded at different quality levels to support delivery over varying network conditions. However, for each of the image types above, a compositionally-comparable JPEG image could be served in its place, albeit perhaps with some qualitative loss of experience.

A novel cache eviction scheme exploits the ability to substitute one object version for another. An object that can be substituted for one or more other objects is referred to herein as a 'versatile' object. The versatility of an object can be captured using an attribute (e.g., a header field with a true/false, or a header field listing other types for which it can be substituted), or captured using a data structure (e.g., a preference list or tree structure defining allowed substitutions and/or versatile objects), or captured as a quantitative measurement or score (which could be used in eviction decision-making although it may not explicitly indicate permissible substitutions).

The versatility of an object (whether in the form of an attribute, preference list, score, or otherwise) can be provided by the content provider, determined by a rules engine, or generated dynamically by a network cache or related components.

Example Scenario

Suppose one has a library of original images, and wish to re-encode them to support the highest-quality images with the smallest over-the-wire size. You may end up with the following outputs for each original image in your library, each output compositionally similar to one another:

JPEG—viewable everywhere, including Firefox
WebP—only viewable in Chrome
JPEG—2000—only viewable in Safari
JPEG—XR—only viewable in Internet Explorer As content is requested, there may be client demand for all four derivatives such that they are each added to a network cache. Such a network cache may have the following request rates over a given time period:

WebP—60%
JPEG—25%
JPEG—2000-10%
JPEG—XR—5%

If due to cache pressure only one object can be retained after some number of eviction cycles, with conventional cache eviction algorithms it's possible that only the WebP will remain, because it has the highest request rates. Such an outcome is suboptimal, as only a fraction of the total browser population can actually decode a WebP image, and thus, the cache will soon need to be repopulated with a differently-formatted image object for any WebP-incompatible browser making a request. This activity could cause cache 'thrash' and an undesirable cache miss rate.

If instead the network cache were aware of acceptable substitutes, under cache pressure it might only keep (and serve) the JPEG, which can be decoded by all browsers, thereby providing better performance and cache hit rates while trading off a slightly higher over-the-wire file sizes.

In one embodiment, a network cache can manage such related objects as a preference-ordered group. The objects in the group are essentially managed for eviction based on their versatility.

In one embodiment, the versatility of a given object can be a function of proportion of clients that can decode the given object. In another embodiment, the versatility of an object can also be indicated by an attribute of the object informing the network cache that this object may be substituted for one or more other objects (e.g., a JPEG may be served in place of a WebP). The information about permissible substitutions can be provided by an origin server, or by user configuration of the network cache, or otherwise. The information could be attached to an object as metadata, and/or reflected in a data structure stored at the network cache, or otherwise.

The data structure stored at the network cache could be, in one embodiment, an ordered-preference list for eviction preferences, in which case the network cache can evict from the tail and keeping the head as long as possible even in the presence of contradictory caching rules (such as LRU, LFU schemes).

Cache Eviction Algorithm

One example cache eviction algorithm utilizes an ordered preference list, and its explanation follows Here is a set of sample code:

```
1    if i exists in C
2    then
3       return i
4    else
5       if under cache pressure
6       then
7          evict(last(p_i))
8          return(first(p_i))
9       else
10          fetch(i)
11          store(i)
12          sub = DetermineSubstitute(i)
13          AddToPreferenceList(i, p_i, sub)
14          return i
15       fi
16    fi
17
18    AddToPreferenceList(p_i, i, sub)
19       if sub
20       then
21          addfirst(p_i, i)
22       else
23          push(p_i, i)
24          update C_i per C's eviction scheme
25       fi
26    end
27
28    DetermineSubstitute(i)
29       if i can be a substitute
30       then
31          return True
32       else
33          return False
34       fi
35    end
```

In the algorithm above, C represents the network cache, i is the requested object, and $p_i$ is a preference list of object related to i.

Stepping through it, we first check to see if the object is in the cache, and if it is, return it. Next, we determine whether or not the cache is facing eviction pressure. Eviction pressure can be determined in a number of ways, as known in the art. It be based on a determination that the storage space in the network cache is too low, which could be the case because the next hit will cause the cache to exceed allocated storage space ("disk full"), or to exceed number of objects. Note that the storage space under pressure might be the entire cache space; or a portion of the cache allocated to a given content provider, object type, service, or the like.

If the network cache is not under eviction pressure, the requested object 'i' is fetched and stored. If the network cache is under eviction pressure, the network cache first evicts from the end of the preference list. The order of the preference list is preferably dictated by an eviction algorithm, with the candidates most likely to be evicted at the end. Examples of an eviction algorithm include least recently used (LRU) and least frequently used (LFU). Note that the substitute object occupies a special place at the head of the list (regardless of what its position would be under the eviction algorithm being used), so that it is not a likely candidate for eviction.

Hence, after the cache evicts from the end of the preference list, it returns the substitute which exists at the head of the preference list. (This assumes that the head of list object is a permissible substitute; the process of checking to see if the object can be a substitute is described below.) This approach works when there is a substitute that can be substituted for all others in the group. The fact that an object is listed at the head of the preference list indicates that this is true. (In effect, being listed at the head of the list is a versatility attribute.)

Figure 2:
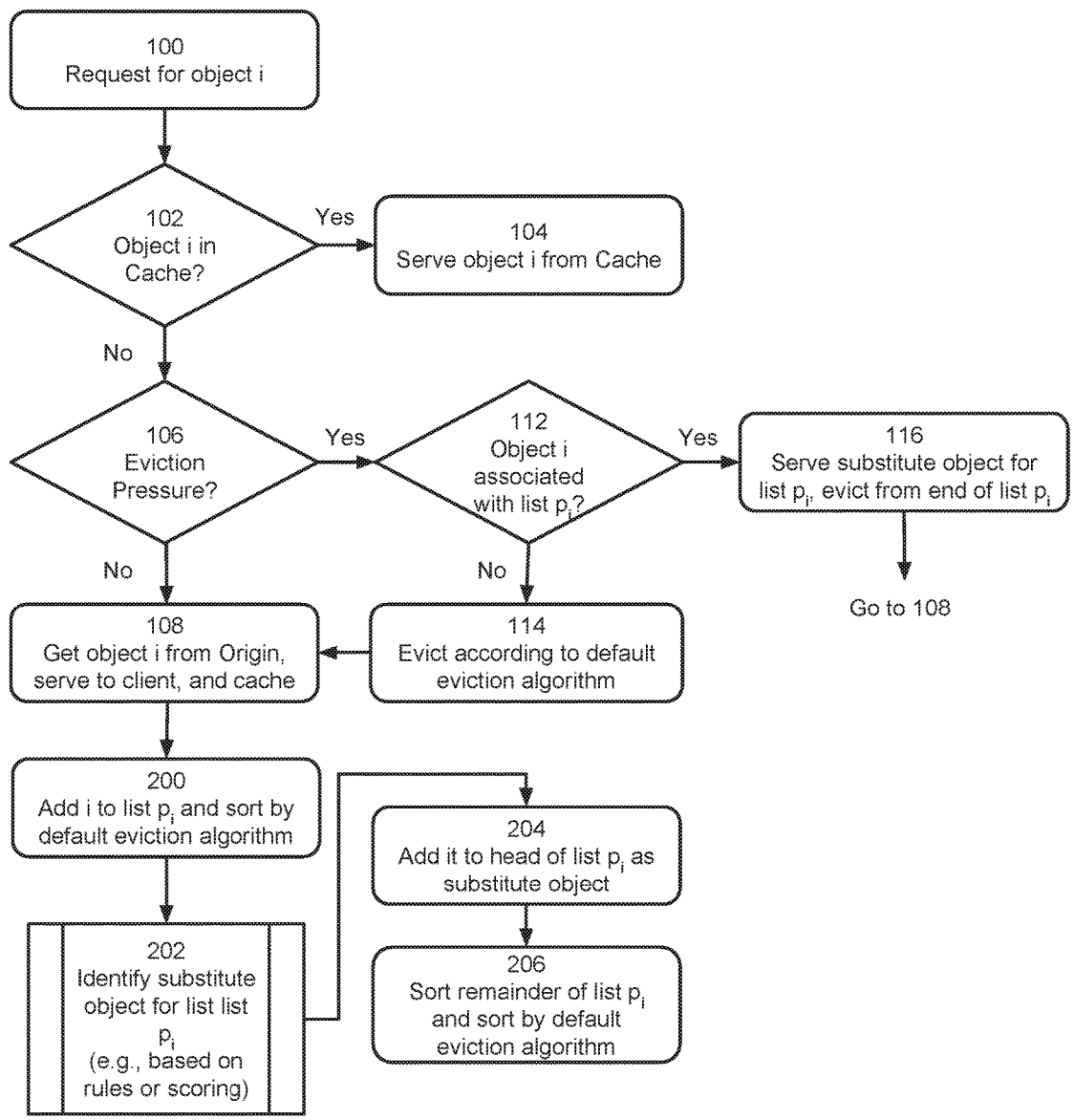
FIG. 2 is a flow diagram illustrating steps in a method for identifying objects to evict from a cache, in another embodiment.

FIGS. 1-2 illustrate the logical flow described above. These FIGURES differ in steps 110 in FIGS. 1 and 200-206 in FIG. 2, which will be in more detail later in this document.

Figure 3:
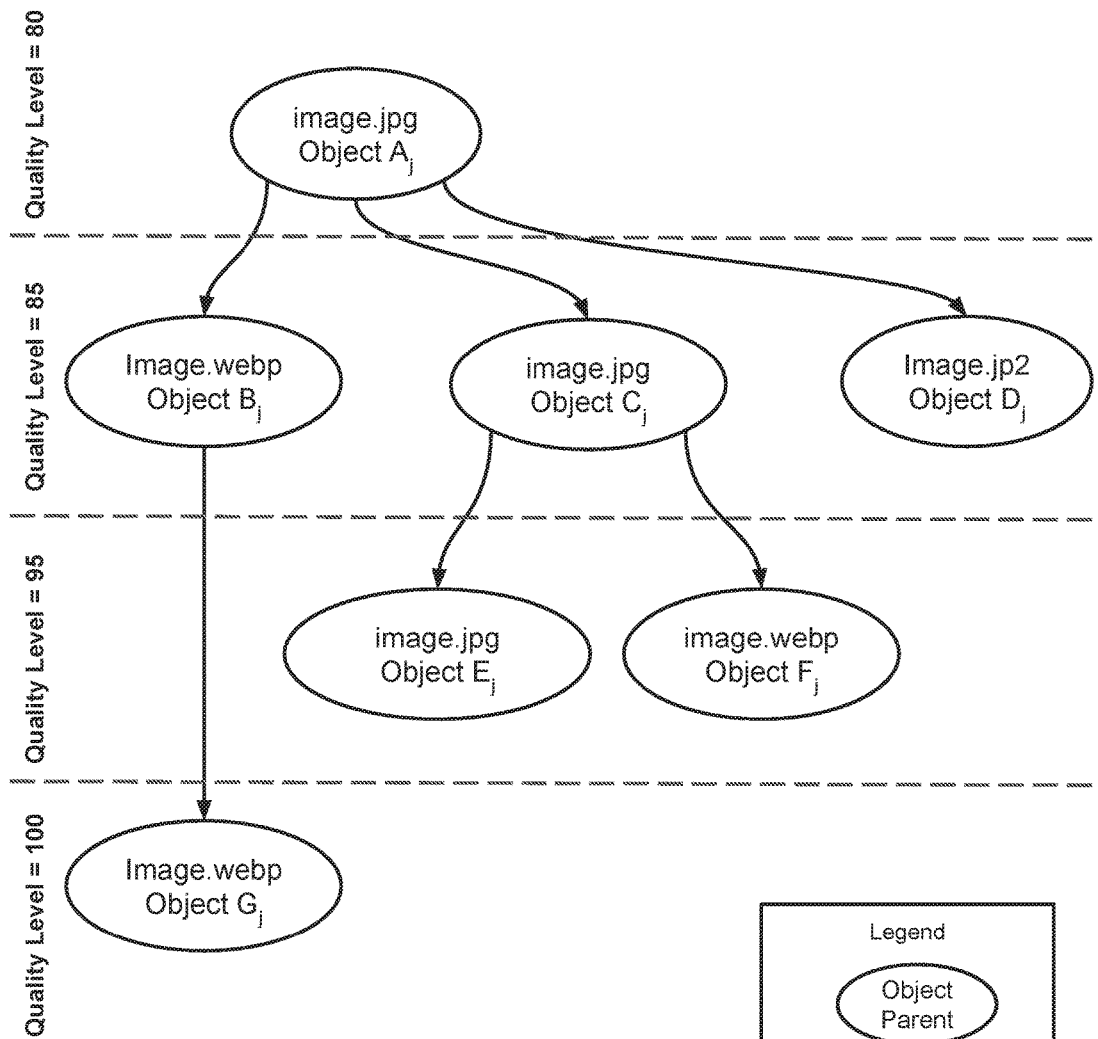
FIG. 3 is representation of a data structure in the form of a hierarchical directed graph structure.

FIG. 3 and Directed Graphs

For more complex taxonomies of object versions, the data structure could be implemented as a directed graph with parent objects pointing to one or more child objects, where parent objects can be substituted for child objects. This is shown in FIG. 3, with objects A-G all being members of a group of versions 'j'. Using this approach, when the network cache identifies a given object for eviction, it can walk the graph downwards to identify a child object, and then evict that child object instead. For example, if object were identified as an eviction target (e.g., due to LRU or other eviction algorithm), the network cache can then walk the graph to object $G_j$ and evict that object instead.

In some cases, there may be multiple child objects for a given parent; in these cases, the network cache can select amongst them for eviction based on an LRU or LFU algorithm, or can select amongst them for eviction on the basis of each child's number of downstream children (child versatility), with higher being preferred to keep in cache.

The approach illustrated in FIG. 3 works for managing objects of differing quality; put another way, if the objects in group 'j' differ in quality, then the FIG. 3 graph can be used to rid of higher-resolution images ones (which are larger) first.

For example, assume a network cache was configured with a cutoff at 80 quality, where 80 is a measure according to a quality metric (e.g., compression value or visual perceptive value) and each object in the FIG. 3 graph is associated with a quality measure. Below it in the graph, one might have 85, 95, and lossless qualities. You'd evict lossless first, then the others one-by-one (maybe skipping all of the way to 80 if that's what the cutoff was). The cutoff in this case can be thought of as the minimum usable quality score. Note that there could be multiple derivative formats at the given quality level, as shown in FIG. 3 by objects $B_j$, $C_j$, and $D_j$, all at quality=90.

Determining Whether an Object is a Substitute (110 in FIG. 1; 200-206 in FIG. 2)

Returning to the preference list embodiment, a determination is made of an object's suitability to serve as a substitute. This can be done in a variety of ways.

In a first embodiment, there could be some signal sent by the content provider at cache miss time that a given object is an permissible substitute for all objects in a preference list $p_i$. In web transactions, this may be done via HTTP response headers, sent as additional metadata within or as an attachment to the object, or otherwise encoded. Thus, when providing an object to the network cache, the content provider's origin server can attach a header with a "versatility" attribute indicating the other objects (or the group of objects) for which the instant object can be used as a substitute. This may take the form of a list of content types, for example.

The first embodiment is illustrated in FIG. 1.

In a second embodiment, there could be a rules engine encoded into the network cache providing a substitution algorithm, such as: For any collection of related items $p_i$, the object with content-type JPEG can be served in place of any others. In this approach, a particular object will be identified as versatile by virtue of its content-type. The collection of related items can be identified as related, based on a tag or the like, from origin. Or, the where the CDN generates several derivative versions from an original version, the image processing service can add the "related" tag (which is a unique id) to the versions at that time.

In a third embodiment, the network cache can apply a learning algorithm to determine which class of objects are most often consumed by the widest number of end user clients. It could then automatically assign the object that meets these criteria as the "perfect" substitute within a preference list. This approach takes into account the popularity and versatility of a given version of an object. This can be implemented in a scoring system that scores objects such that the more popular and/or more versatile objects are less preferred for eviction. The network cache (or another component) can determine the popularity and versatility of an object by examining server logs. The number of requests indicates popularity. User agent can be used to determine the client application (e.g., browser) that made the request, and that information can be used to determine how widely the object is accepted by clients. The weighting between popularity and versatility can be a implementation decision and may vary over time and per system, and network cache user preferences. Hence the objects in a group $p_i$ can be scored as follows:

Object score for object $i = A(\text{request\_frequency}\_i) + B (\text{client\_population\_acceptance\_rate})$ where A and B are coefficients.

The object with the highest score can be treated as the substitute object in the list $p_i$.

The second and third embodiments are shown in FIG. 2, at boxes 200, 202, 204, 206.

Use in Content Delivery Networks

As noted above, the teachings hereof may be implemented in a system in which the network cache is in a server in a CDN and that server must make cache eviction decisions.

A description of a conventional CDN is now provided.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 4:
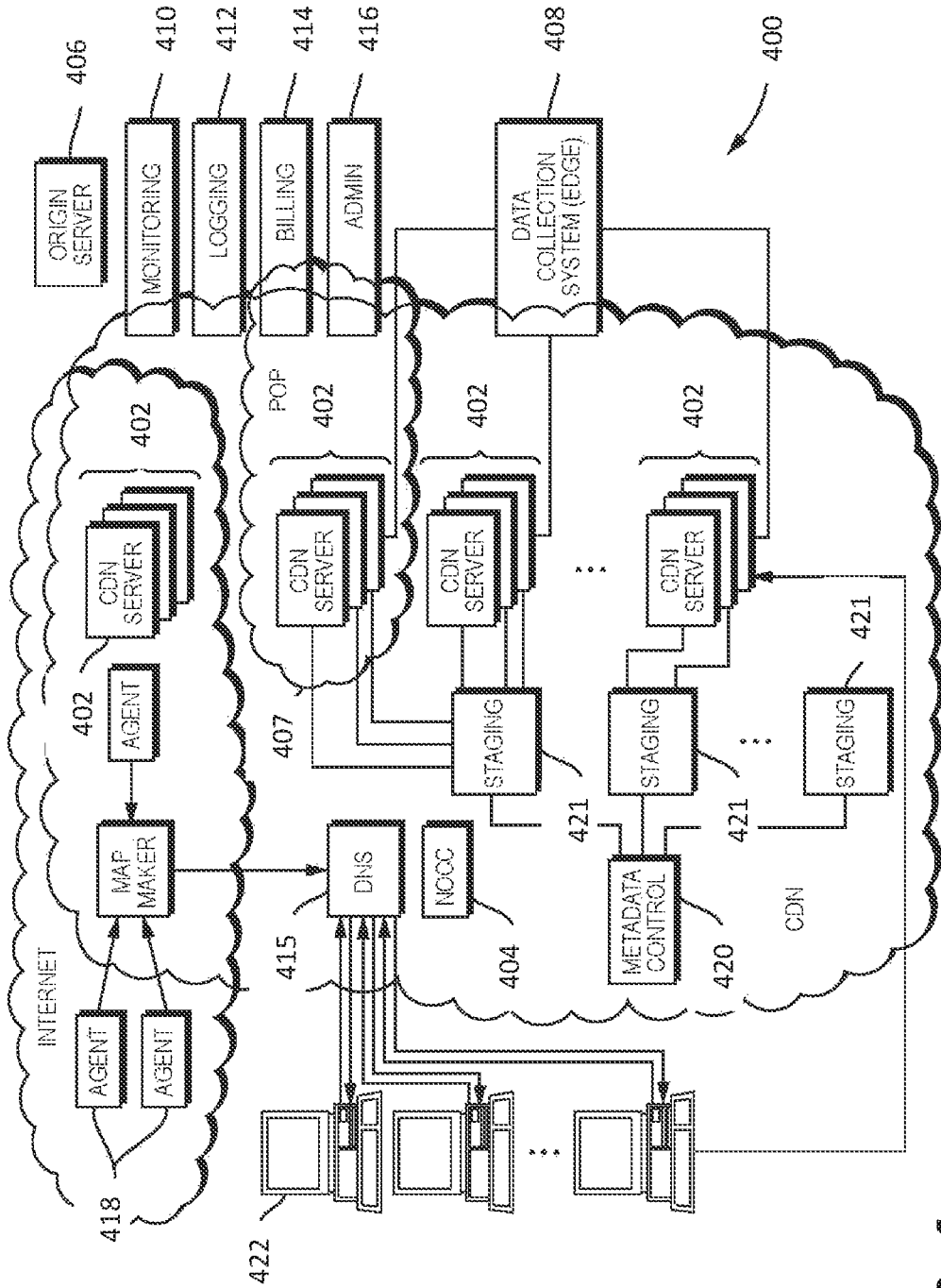
FIG. 4 is a high-level diagram of an embodiment of the content delivery network (CDN) in which the teachings hereof may be implemented.

In a known system such as that shown in FIG. 4, a distributed computer system 400 is configured as a content delivery network (CDN) and is assumed to have a set of machines 402 distributed around the Internet. The machines 402 are servers and can be the network cache mentioned in this document. Typically, most of the machines are configured as servers and located near the edge of the Internet, i.e., at or adjacent end user access networks. A network operations command center (NOCC) 404 may be used to administer and manage operations of the various machines in the system. Third party sites affiliated with content providers, such as web site 406, offload delivery of content (e.g., HTML or other markup language files, embedded page objects, streaming media, software downloads, and the like) to the distributed computer system 400 and, in particular, to the servers 402 (which are sometimes referred to as content servers, or sometimes as "edge" servers in light of the possibility that they are near an "edge" of the Internet). Such servers may be grouped together into a point of presence (POP) 407.

Typically, content providers offload their content delivery by aliasing (e.g., by a DNS CNAME) given content provider domains or sub-domains to domains that are managed by the service provider's authoritative domain name service. End user client machines 422 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 4, the distributed computer system may also include other infrastructure, such as a distributed data collection system 408 that collects usage and other data from the CDN servers, aggregates that data across a region or set of regions, and passes that data to other back-end systems 410, 412, 414 and 416 to facilitate monitoring, logging, alerts, billing, management and other operational and administrative functions. Distributed network agents 418 monitor the network as well as the server loads and provide network, traffic and load data to a DNS query handling mechanism 415, which is authoritative for content domains being managed by the CDN. A distributed data transport mechanism 420 may be used to distribute control information (e.g., metadata to manage content, to facilitate load balancing, and the like) to the CDN servers.

A given machine in the CDN comprises commodity hardware (e.g., a microprocessor) running an operating system kernel (such as Linux® or valiant) that supports one or more applications. To facilitate content delivery services, for example, given machines typically run a set of applications, such as an HTTP proxy, a name server, a local monitoring process, a distributed data collection process, and the like. The HTTP proxy typically includes a manager process for managing a cache and delivery of content from the machine. For streaming media, the machine typically includes one or more media servers, as required by the supported media formats.

A given CDN server 402 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the interact cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "Net-Storage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems; but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
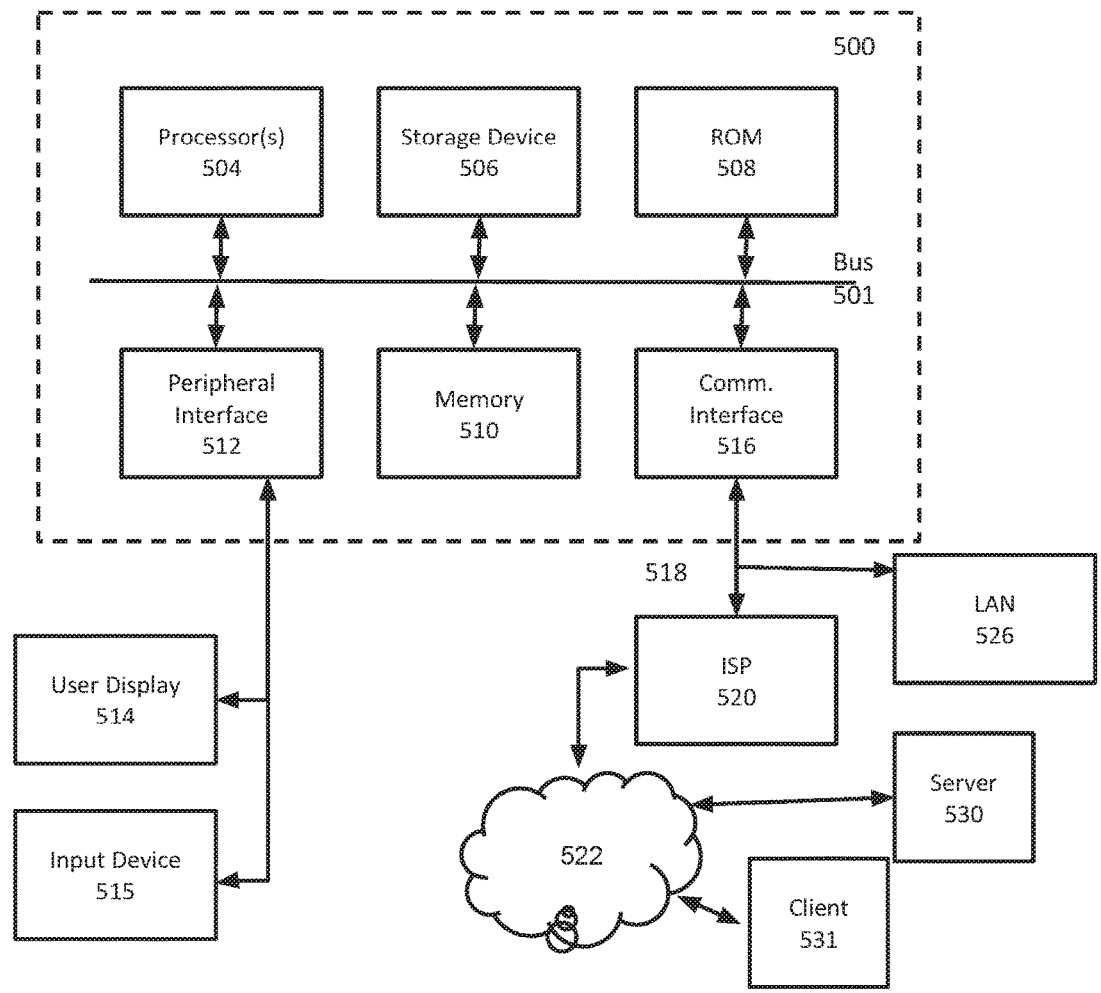
FIG. 5 is a block diagram illustrating hardware in a computer system that may be used to implement the teachings hereof.

FIG. 5 is a block diagram that illustrates hardware in a computer system 500 upon which such software may run in order to implement embodiments of the invention. The computer system 500 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 500 includes a microprocessor 504 coupled to bus 501. In some systems, multiple processor and/or processor cores may be employed. Computer system 500 further includes a main memory 510, such as a random access memory (RAM) or other storage device, coupled to the bus 501 for storing information and instructions to be executed by processor 504. A read only memory (RUM) 508 is coupled to the bus 501 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

A peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. The peripheral interface 512 may include interface circuitry, control and/or level-shifting logic for local buses such as RS-485, Universal Serial Bus (USB), IEEE 1394, or other communication links.

Computer system 500 is coupled to a communication interface 516 that provides a link (e.g., at a physical layer, data link layer,) between the system bus 501 and an external communication link. The communication interface 516 provides a network link 518. The communication interface 516 may represent a Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the processor executing code. Such code may be read from or stored on a non-transitory computer-readable medium, such as memory 510, ROM 508, or storage device 506. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 518 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A cache eviction method performed by a network cache, the method comprising:
    storing first and second objects in a network cache, each of the first and second objects corresponding to a different version of a media object and being available to requesting clients from the network cache;
    determining to evict content from the network cache, the determination based at least in part on an amount of available storage space in the network cache;
    in response to said determination, selecting the first object for eviction and keeping the second object stored in the cache, the selection being based at least in part on a versatility attribute of the second object, wherein versatility comprises a property allowing the network cache to substitute the second object for the first object when responding to a client request for the first object; and,
    evicting the first object from the network cache.

2. The method of claim 1, further comprising, receiving a client request for the first object, and in response, serving the second object from the network cache.

3. The method of claim 1, wherein the media object comprises any of: an image file, an audio file, and a video file.

4. The method of claim 1, wherein the first and second objects are different at least because of differences in one or more of: format, compression ratio, resolution, aspect ratio, image dimensions.

5. The method of claim 1, further comprising receiving the versatility attribute for the second object from an origin server.

6. The method of claim 1, further comprising receiving the versatility attribute for the second object from a configuration provided by a user.

7. The method of claim 1, further comprising receiving the versatility attribute for the second object from a learning algorithm.

8. The method of claim 1, further comprising receiving the versatility attribute for the second object from a learning algorithm that analyzes at least request frequency by any of: user agent, player application, and client device type.

9. The method of claim 1, further comprising: receiving the second object from an origin server and generating the first object from the second object.

10. The method of claim 1, wherein the versatility attribute comprises a ranking of the first and second objects.

11. The method of claim 10, further comprising receiving the ranking from any of: an origin server and a configuration portal.

12. The method of claim 1, further comprising, prior to selecting the first object for eviction, selecting a group comprised of the first and second objects for eviction.

13. An apparatus, comprising:
a network cache, comprising:
circuitry providing at least one processor;
a storage device providing space for storing objects;
a non-transitory computer readable medium storing instructions that, when executed by the at least one processor, cause the network cache to:
store first and second objects in a network cache, each of the first and second objects corresponding to a different version of a media object and being available to requesting clients from the network cache;
determine to evict content from the network cache, the determination based at leak in part on an amount of available storage space in the network cache;
in response to said determination, select the first object for eviction and keeping the second object stored in the cache, the selection being based at least in part on a versatility attribute of the second object, wherein versatility comprises a property allowing the network cache to substitute the second object for the first object when responding to a client request for the first object; and,
evict the first object from the network cache.

14. The apparatus of claim 13, the non-transitory computer readable medium storing instructions that, when executed by the at least one processor, cause the network cache to: receive a client request for the first object, and in response, serving the second object from the network cache.

15. The apparatus of claim 13, wherein the first and second objects are different at least because of differences in one or more of: format, compression ratio, resolution, aspect ratio, image dimensions.

16. The apparatus of claim 13, the non-transitory computer readable medium storing instructions that, when executed by the at least one processor, cause the network cache to: receive the second object from an origin server and generate the first object from the second object.

17. The apparatus of claim 13, wherein the versatility attribute comprises a ranking of the first and second objects.

18. A cache eviction method for a network cache, comprising:
storing first and second objects in a network cache, each of the first and second objects corresponding to a different version of a media object and being available to requesting clients from the network cache;
determining to evict content from the network cache, the determination being based at least in part on an amount of available storage space in the network cache;
in response to said determination, selecting the first object for eviction and keeping the second object stored in the cache, the selection being based at least in part on a versatility attribute of the second object, wherein versatility of the second object is a function of proportion of clients that can decode the second object; and,
evicting the first object from the network cache.

19. The method of claim 18, comprising generating a ranking of the versatility of the plurality of objects, and further comprising, in response to the determination to evict content from the network cache, consulting the ranking.

* * * * *